F. E. TUXWORTH.
CONVEYER CLEAT.
APPLICATION FILED NOV. 6, 1911.
1,024,232.
Patented Apr. 23, 1912.
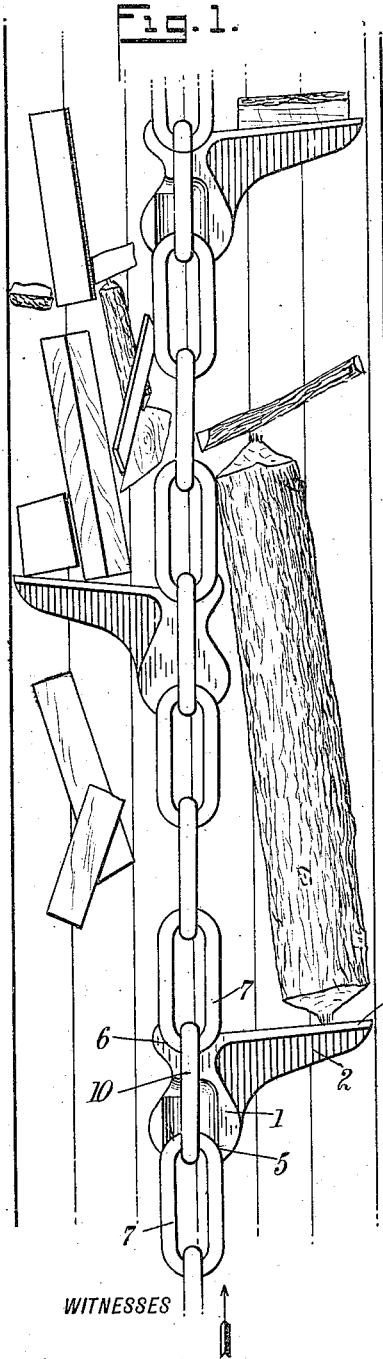
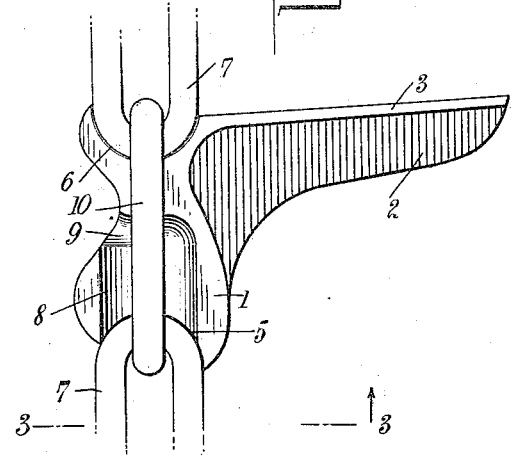
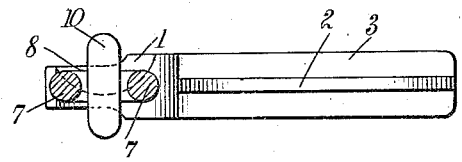
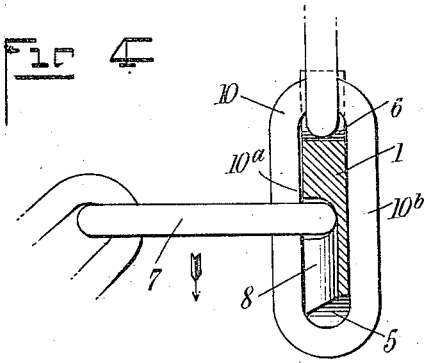
WITNESSES
Sidney Brooks
L. J. Gallagher
INVENTOR
Frank E. Tuxworth
BY Munn & Co
ATTORNEYS ized as: # UNITED STATES PATENT OFFICE.

FRANK EDWARD TUXWORTH, OF FULLERTON, LOUISIANA.

CONVEYER-CLEAT.

1,024,232. Specification of Letters Patent. Patented Apr. 23, 1912.

Application filed November 6, 1911. Serial No. 658,735.

*To all whom it may concern:*

Be it known that I, FRANK E. TUXWORTH, a citizen of the United States, and a resident of Fullerton, in the parish of Vernon and State of Louisiana, have invented a new and Improved Conveyer-Cleat, of which the following is a full, clear, and exact description.

My invention involves a new and improved conveyer cleat and one which is especially adapted for use with chain conveyers.

The principal object of my invention is to provide a new and improved form of cleat which is adapted to be positioned in any one of the links of a chain whereby the chain and cleats may be used for conveying articles through a suitable conveyer or chute.

A further object of my invention is to provide a new and improved form of cleat which is adapted to be used with chains running in either direction, the cleat being easily removed from the chain and reversed in position.

A further object of the invention is to provide a conveyer cleat of simple construction and one which will be rigidly held in position in any one of the links of a chain, the cleat being easily removable whereby the distance between successive cleats may be varied when so desired.

Other objects and advantages of the invention will appear as the description thereof proceeds, all of which is particularly pointed out and included in the appended claims.

Reference is to be had to the accompanying drawings forming a part of this specification in which similar characters of reference denote corresponding parts in all the views, and in which—

Figure 1 is a partial plan view of a chain having cleats thereon used as a conveyer for logs or similar refuse in a chute; Fig. 2 is an enlarged side view of one of the cleats showing its relation with the adjacent links; Fig. 3 is a sectional view on the line 3—3 of Fig. 2; Fig. 4 is a sectional view showing the position to which the lowest link of Fig. 2 is moved in order to permit the cleat to be withdrawn.

The improved cleat which embodies the subject-matter of this application may be made in any desired size or material, the particular conformation of certain details thereof depending on the size and shape of the chains with which it is used, such variations being matters of expediency and being kept in mind in the description of my invention.

The cleat is shown most particularly in Fig. 2 and is preferably of integral construction and embodies the end portion 1 and the laterally extending portion 2. These two portions extend angularly with respect to each other, the portion 1 being adapted for engagement with successive links while the portion 2 is provided with an extended side 3, this side extending at a right angle with respect to the chains whereby suitable material, such as logs 4 may be engaged thereby as shown particularly in Fig. 1. The portion 1 at opposite sides is provided with pockets or recesses 5, 6, the curvature of these pockets being similar to the curved ends of the links 7 of the chain with which the cleat is used; one side of the cleat is recessed as at 8, this recess extending substantially from the intermediate side portion 9 and thence to the pocket or recess 5. The thickness of the portion 1 is substantially equal to the width of the opening between the sides $10^a$, $10^b$, of the link 10 (Fig. 4) within which this portion is inserted. The depth of the recess 8 in the side of the portion 1 is substantially equal to the diameter of the material which makes up the link 7, this recess being adapted to receive the end of the link 7 and permit movement thereof relatively to the link 10 when it is desired to withdraw the cleat from position.

As shown particularly in Fig. 2, the cleat is firmly positioned within the link 10 and the recesses or pockets 5, 6, are in engagement with the ends of adjacent links 7 so that when the chain is maintained in the position shown in Fig. 1, the cleat is secured against removal; when it is desired to remove the cleat, however, either for the purpose of reversing it or for moving it into engagement with any other link, the lower link 7 is moved upwardly into a position at right angles to the adjacent link 10 when, by reason of the recess 8 in the side of the portion 1, the link 7 may be bodily moved along the recess 8 until the curved end of the link registers with the end of the recess at the intermediate point 9 of the portion 1; the cleat may now be conveniently withdrawn from the link 10 by turning the cleat about the curved end of the link 7. The cleat is now free to be placed in any other desired position.

Since the cleat herein described is adapted for use with different chains now used on conveyers, it is obvious that the cleat may be disposed of as an article of manufacture and positioned for use in any of these chains; to this end I have appended claims herein drawn to the cleat as a new article of manufacture.

The cleat may be made in different standard sizes for use with different chains, the operation being the same whatever the size of the chain and the body portion thereof being firmly secured in position so that logs or lumber or any other material may be carried along by the conveyer in any chute or conveyer shaft. Of course the cleat itself is subject to many modifications and variations as to form and shape, such details being largely matters of choice and included within the spirit and scope of the appended claims.

Having thus described my invention, I claim as new, and desire to secure by Letters Patent:—

1. A conveyer cleat having a portion thereof formed with pockets at opposite ends, the said portion being adapted to be inserted into a link with the pockets in engagement with the ends of adjacent links, there being a recess on the side of the said portion whereby movement of one of the adjacent links relatively to the said portion is permitted.

2. A cleat for conveyers comprising a portion having pockets therein at opposite points thereof, the said portion being adapted to be positioned within a link of a chain, with the pockets in engagement with the ends of adjacent links, the side of the said portion being provided with a recess whereby one of the links may be moved out of one of the pockets in order to permit the cleat to be withdrawn.

3. A cleat for conveyer chains comprising a portion having pockets at opposite ends thereof, the said pockets being adapted to receive the ends of adjacent links when the portion is inserted into one link, there being a recess in the side of the said portion whereby one of the said adjacent links may be moved relatively to the said portion in order to permit the cleat to be withdrawn from the said link.

4. As a new article of manufacture, a conveyer cleat having pockets at opposite ends thereof, the side of the cleat between the pockets being provided with a recess.

5. As a new article of manufacture, a conveyer cleat having pockets at opposite ends thereof, one side of the cleat being provided with a recess, one end of the recess communicating with one of the pockets and the other end of the recess being intermediate of the said pockets.

6. As a new article of manufacture, a conveyer cleat having pockets at opposite ends thereof, one side of the cleat being provided with a recess, one end of the recess communicating with one of the pockets, and the other end of the recess being intermediate of the said pockets, the said intermediate end being of a depth substantially equal to the thickness of the link with which the cleat is adapted to be used.

In testimony whereof I have signed my name to this specification in the presence of two subscribing witnesses.

FRANK EDWARD TUXWORTH.

Witnesses:
 VALLY B. CROZIER,
 C. A. YARBORO.

Copies of this patent may be obtained for five cents each, by addressing the "Commissioner of Patents, Washington, D. C."